(12) United States Patent
Sigona

(10) Patent No.: US 9,776,899 B2
(45) Date of Patent: Oct. 3, 2017

(54) FULL CONTACT UV WATER PURIFICATION SYSTEM

(76) Inventor: Jon-Andrew Vincent Sigona, Scottsdale, AZ (US)

( * ) Notice: Subject to any disclaimer, the term of this patent is extended or adjusted under 35 U.S.C. 154(b) by 190 days.

(21) Appl. No.: 13/473,580

(22) Filed: May 16, 2012

(65) Prior Publication Data

US 2013/0306561 A1    Nov. 21, 2013

(51) Int. Cl.
  C02F 1/32     (2006.01)
  C02F 9/00     (2006.01)
  C02F 1/00     (2006.01)
  C02F 1/28     (2006.01)
  C02F 1/44     (2006.01)

(52) U.S. Cl.
  CPC ............... *C02F 9/00* (2013.01); *C02F 9/005* (2013.01); *C02F 1/003* (2013.01); *C02F 1/283* (2013.01); *C02F 1/32* (2013.01); *C02F 1/441* (2013.01); *C02F 2001/007* (2013.01); *C02F 2201/007* (2013.01); *C02F 2303/04* (2013.01)

(58) Field of Classification Search
  CPC .. C02F 1/002; C02F 1/003; C02F 1/32; C02F 1/283; C02F 1/441; C02F 9/00; C02F 9/005; C02F 2303/04

USPC .......................................................... 210/195.1
See application file for complete search history.

(56) References Cited

U.S. PATENT DOCUMENTS

| | | | |
|---|---|---|---|
| 4,969,991 A * | 11/1990 | Valadez | 210/96.2 |
| 5,017,284 A * | 5/1991 | Miler | B01D 61/025 210/175 |
| 6,723,232 B2 | 4/2004 | Simon | |
| 7,303,666 B1 | 12/2007 | Mitsis | |
| 7,507,334 B1 | 3/2009 | Sigona | |
| 2009/0057239 A1* | 3/2009 | Walker | 210/742 |

* cited by examiner

*Primary Examiner* — Terry Cecil
(74) *Attorney, Agent, or Firm* — Bycer Law, PLC; Matthew L. Bycer

(57) ABSTRACT

A water treatment system having modular-filter based residential reverse osmosis (RO) system that passes a stream of purified water through an ultraviolet light (UV) filter twice to ensure the water is sterile, while using only one UV filter, thereby forcing the water through a UV filter twice in a modular-filter based RO system. The water treatment system also includes a system whereby water passes through the UV filter at both points using only one UV filter by employing a system whereby a purified water stream is passed through a single remineralization module twice. The present invention also includes the method for treating water through such double forced sterilization system.

17 Claims, 4 Drawing Sheets

21) Sediment Filter
22) Carbon/media Filter
23) Automatic Shut-off Valve
24) Reverse Osmosis Membrane
25) 3-Way Tee Fitting
26) Carbon/media Filter
27) UV Filter
28) 3-Way Tee Fitting
29) Check valve
30) 3-Way Tee Fitting
31) Storage Tank
32) Check valve

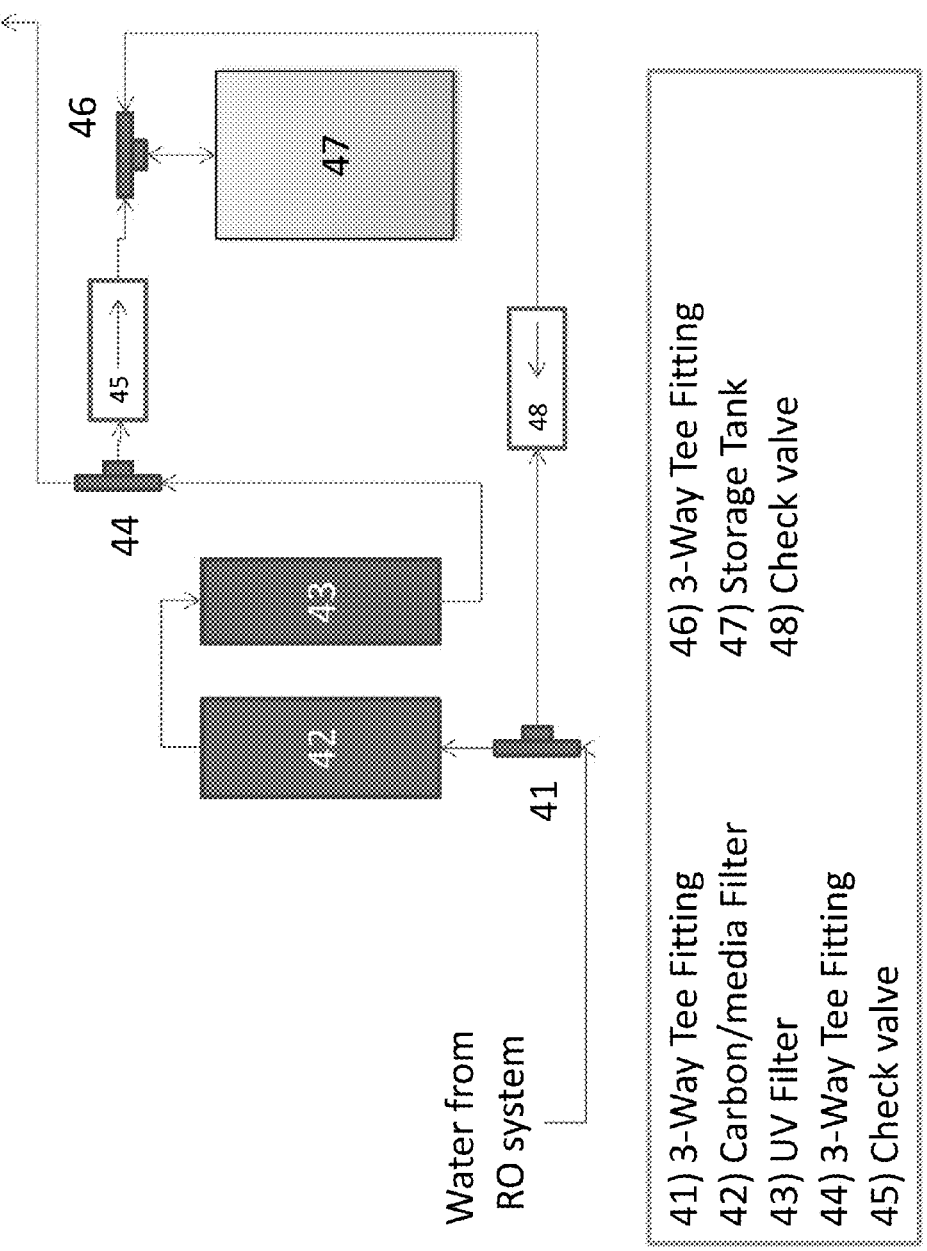

FULL CONTACT UV WATER PURIFICATION SYSTEM

BACKGROUND OF INVENTION

The present invention relates to water-filtration systems, and more particularly, the present invention relates to modular-filter based UV-irradiated water purification systems for home and garden.

It is well known in the prior art to utilize particulate filters and reverse-osmosis filters to clear source water of particles of certain size and to eliminate certain chemicals and ions from the source water. It is also known in the art to utilize UV-irradiation of source water to neutralize possible pathogens and micro-organisms in the source water. In some instances, a storage tank may be used to house filtered and cleaned water for dispensation through a tap. All of such devices generally rely upon a single pass through the filtration system, and none have yet optimized a system for multiple UV-irradiation runs of source water to tap. In a reverse osmosis system using a UV filter the design is typically to put the UV filter at the end of the system immediately prior to the point of use to ensure the water dispensed is sterile. Alternatively, a system designer may place the UV filter before the storage vessel where the flow rate is slower to enhance the sterilizing dose and prevent the storage vessel and thus the system from becoming a potential breeding ground for microorganisms.

The present invention, FULL CONTACT UV, is a modular-filter based reverse osmosis system with a ultra-violet (UV) sterilization system whereby the purified water is channeled through the same UV filter cartridge twice to eliminate 99.99% of the flow of microorganisms into the storage vessel—a potential breeding point—and to again 99.99% eliminate the flow of microorganisms into the point of use without having to use two separate UV filters. It has been found that certain storage systems, particularly for agricultural based purified water, can be the breeding ground for unwanted pathogens or microorganisms, and may offer an opportunity for post-treated water to become contaminated.

Additionally, while reverse osmosis membranes filter at a level finer than any bacteria or virus, they will develop micro-tears during their lifecycles which permits the breakthrough of microorganisms into the product water even while the membrane is operating within accepted tolerances. In addition, storage in a tank may allow for entry and proliferation of certain unwanted materials and/or organisms that may adversely affect the quality of the water. To protect the reverse osmosis product water stream from contamination by any microorganism breakthrough, a UV-sterilizing filter can now be employed after the reverse osmosis membrane. In the past, UV filters are not used before the RO membrane because they can quickly be rendered ineffective by staining elements such as iron or magnesium, and microorganisms can be shielded from the sterilizing UV light by suspended solids or clumps of particulates. Typical reverse osmosis systems using one UV filter will only sterilize the water at one point either before the storage tank or at the end of the system prior to the point of use. In reverse osmosis systems a UV filter can be placed before the storage vessel to ensure general system hygiene and prevent the storage tank from becoming a breeding ground for microorganisms.

However, prior art designs do not prevent the growth and spread of pre-existing microorganisms between the UV filter and the point of use at dispensation. Locating the UV filter at the end of the system just prior to the point of use ensures the product water is 99.99% sterile (providing the UV filter flow rate is properly matched to the system product flow rate), but it leaves the storage vessel and other upstream system components exposed, creating the possibility of a dangerous level of microorganism breakthrough if the UV filter failed even briefly. Sterilizing RO water is not new, and neither is using a modular-filter based RO system. The present invention teaches a FULL CONTACT UV design by which purified water is forced through a single UV filter cartridge two times, and using it on a modular-filter based platform. Our search revealed no existing products or patents related to the use of our FULL CONTACT UV double UV sterilization system used in conjunction with a modular-filter based RO system.

Similar inventions that provided vast steps forward in water purification technology include the FULL CONTACT ARTESIAN forced double remineralization system as shown in U.S. Pat. No. 7,507,334 to Sigona, incorporated herein by reference. The FULL CONTACT ARTESIAN UV system is the next evolution in the purification of water. This invention is non-obvious to one having ordinary skill in the art, and created after 5 years of testing in the area of UV, RO and sterilization systems and remineralization systems!

The major significant difference between a canister filter based RO system, and a modular filter based RO system is that the canister filter based RO system uses canister filter housings with replaceable filter elements. The filters are changed periodically, but the canister filter housings remain. The owner's manuals of these types of systems urge the user to replace the canister filter housings regularly, usually about once every 5 years, however the vast majority of users do not do this, and the housings will weaken and burst with age potentially causing significant water damage to the user's residence or workplace. Our system—a modular filter based RO system—uses modular filters, where the filter and its housing are molded together and both together are replaced annually or as needed. This prevents the possibility of the filter housing aging and bursting as with the canister filter based system. It is also contemplated that the filters may not be modular and may also include other filter types, such as a canister filter and other filters used in the art of water treatment.

Reverse osmosis system manufacturers have long used UV sterilization as a supplement to their systems to ensure product water potability and/or protect system components. However, those systems could only achieve one of those goals or the other unless they used two UV filters in their system. For example: we offer our TAP MASTER UV Series modular-filter based reverse osmosis system with a UV Filter located prior to the storage tank. We chose this location because the flow rate at this point is very slow, far below the flow rate maximum allowable to ensure 99.99% sterilization, and thus with the increased contact time the sterilizing dosage of UV light can be increased 10 times or more. The drawback is that any pre-existing microorganisms downstream of the UV filter will not be treated. This is the choice every RO with UV system designer had to make—before the storage tank to protect the system and take advantage of the higher UV dosing that comes with the slower flow rate, or place the UV filter at the end of the system to ensure all the water dispensed is treated and hope that the flow rate doesn't exceed specs or the UV light doesn't fail or flicker—until this invention. The water treatment system we present to you here—The FULL CONTACT UV forces the water through the same UV filter twice—once on the way to the storage vessel and once again just prior to the point of use ensuring both system hygiene, and sterilization just prior to the point of use.

Furthermore, the FULL CONTACT UV system is ideal for agricultural purposes. The purpose of irrigation is to minimize the deleterious effects of water stress on growth and yields. Irrigation is necessary to achieve maximum growth and yields over a wide range of growing conditions. The amount of irrigation varies with growing conditions. Irrigation is improved with purified water treatments. Water free of water-borne contaminants in a purified form is beneficial for plants to take up water. Random free ions interfere with water uptake and nutrient load.

Several micro-irrigation systems have been developed that deliver relatively small volumes of water at fairly frequent intervals, thus minimizing the large diurnal variations in soil and plant water status that commonly occur with furrow irrigation. Drip, or trickle, irrigation emitters typically deliver 1-2 gallons per hour and micro-sprinkler systems deliver 5-20 gallons per hour. With escalating costs and lack of availability of high-quality water, micro-irrigation is becoming widely used throughout the world and may continue to be the method of choice in many growing regions.

Micro-irrigation systems provide an efficient method of providing water on a consistent basis; however they require intensive management. Irrigation lines are subject to clogging by particulate matter, insects, spiders, or minerals such as calcium or magnesium which precipitate from the irrigation water. Various iron and sulfur reducing bacteria and algae also cause plugging of emitters. Therefore, water quality and adequate filtration and chlorination (to control algae and bacteria) are necessary to ensure proper operation of the system. Moreover, salts (NA, Cl) may accumulate in and around emitters especially in arid regions, in some cases causing root damage if they are not periodically leached from around the roots.

Traditionally, fertilizer has been banded or broadcast in granular form; however, more recently liquid fertilizer is being applied through irrigation lines (fertigation) in many areas of the world. Some studies suggest that frequent application of low levels of liquid fertilizer improves plant growth over less frequent applications. The theory being that the concentration of nutrients is maintained at a constant level in the soil solution thus allowing continual uptake. Other studies, however, show that frequent fertilization in granular form compared with liquid fertilizer has no effect of growth, possibly because plants take up and store N as amino acids to be used for subsequent growth.

There has been considerable interest in using controlled-release/slow-release fertilizers which reduce the number of fertilizer applications needed per year, and losses due to leaching. Several products are available that have potential, especially in isolated replant situations. The major drawback to acceptance of controlled-release materials it he high cost per unit.

Therefore, there is a need to provide particulate free, ion free and/or sterilized water for irrigation purposes.

Therefore, it is an object of the present invention to produce purified and sterile water from a reverse osmosis system. It is another object of the present invention to produce purified and sterile water from a reverse osmosis system with sterilization taking place before the storage tank and immediately prior to the point of use without the inherent liability of the canister filter based reverse osmosis system. It is still another object of the present invention to produce purified water using UV-exposure. It is a further object of the present invention to conduct sterilization without using multiple UV filters. Furthermore, it is yet another object of the present invention to produce purified and sterile water from a reverse osmosis system with sterilization taking place before the storage tank and immediately prior to the point of use with the inherent benefits of modular filter based reverse osmosis system, and without using multiple UV filters. These and other objects of the present invention will become apparent to those skilled in the art as the description proceeds.

BRIEF SUMMARY OF THE INVENTION

Accordingly, the present invention improves the water purification system by providing duplicative UV sterilization to source water. The water enters the first modular sediment filter which removes sediment particles greater than about 5 microns; the water then passes into a modular carbon filter or mixed media filter with carbon, kinetic degradation fluxion media (commonly known as KDF) or other filtration media which removes chlorine, chemicals and select other compounds; and on to the reverse osmosis membrane where the water is effectively stripped of total dissolved solids, including minerals. This ultra-pure low pH water (pH 6.2-6.8) is then passed through a carbon or mixed media filter, as before, then through the UV sterilization filter on its way to a storage vessel for storage. The water is stored until a user opens a faucet creating a demand. Once the water is demanded, water leaves the storage tank, is channeled back through the same carbon or mixed media filter, then through the UV sterilization filter a second time through the use of check valves to filter and sterilize the water again before it is dispensed for use. The water exiting the system is sterilized twice via UV-irradiation, a first time before entering the water storage tank to ensure system hygiene and increase the UV sterilizing dosage, and a second time prior to dispensation to ensure dispensed water is sterilized.

BRIEF DESCRIPTION OF THE DRAWINGS

The present invention may more readily be understood by reference to the accompanying drawings in which:

FIG. 4 shows another embodiment of the present invention as the FULL CONTACT UV forced double sterilization invention in isolation, with the exception that the carbon/media filter, the UV filter and the storage tank from the earlier model are carried over.

DETAILED DESCRIPTION OF THE PREFERRED EMBODIMENTS

Figure 1:
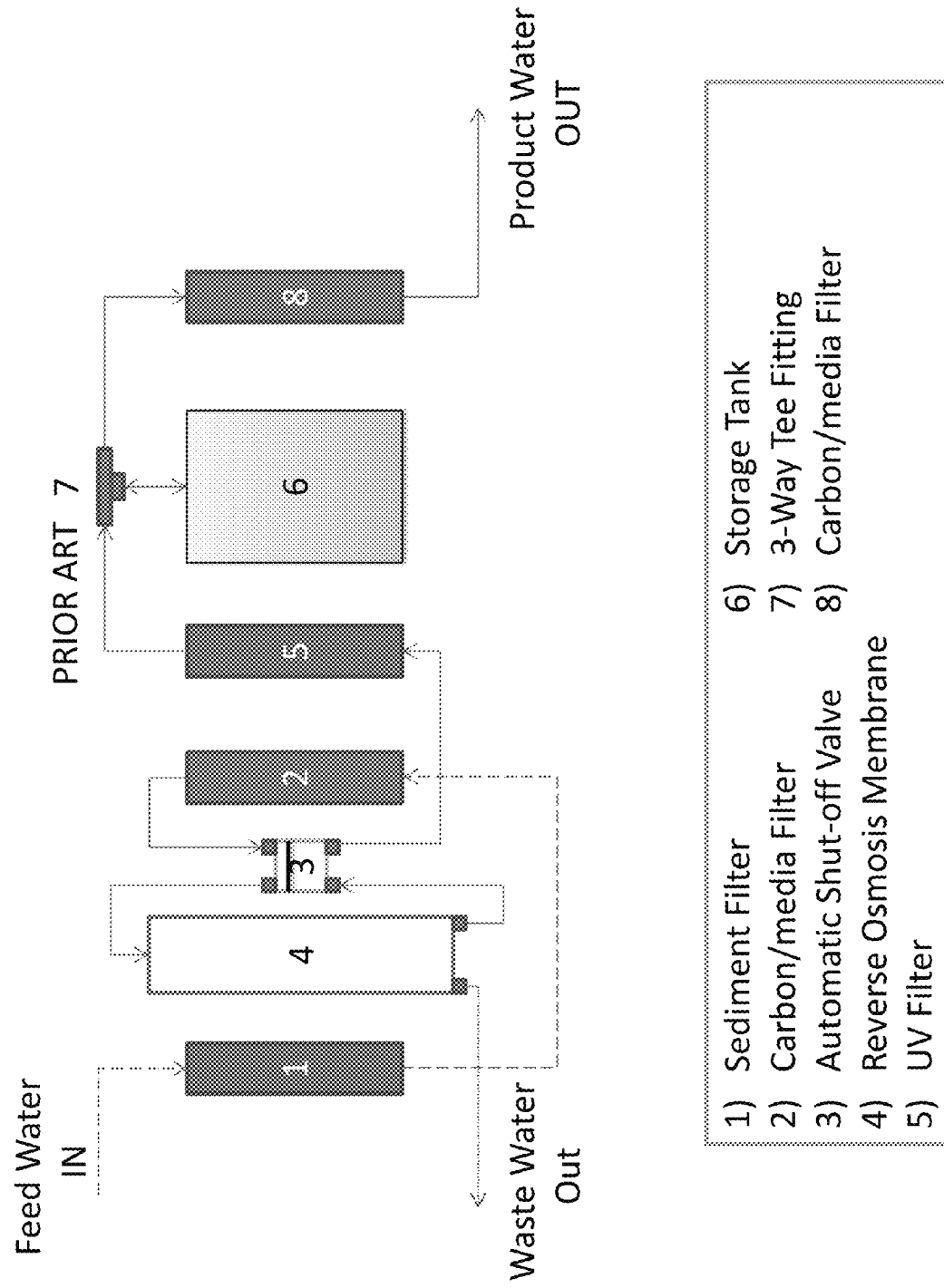
FIG. 1 shows the typical prior art RO system with the UV filter located before the storage tank.
Figure 2:
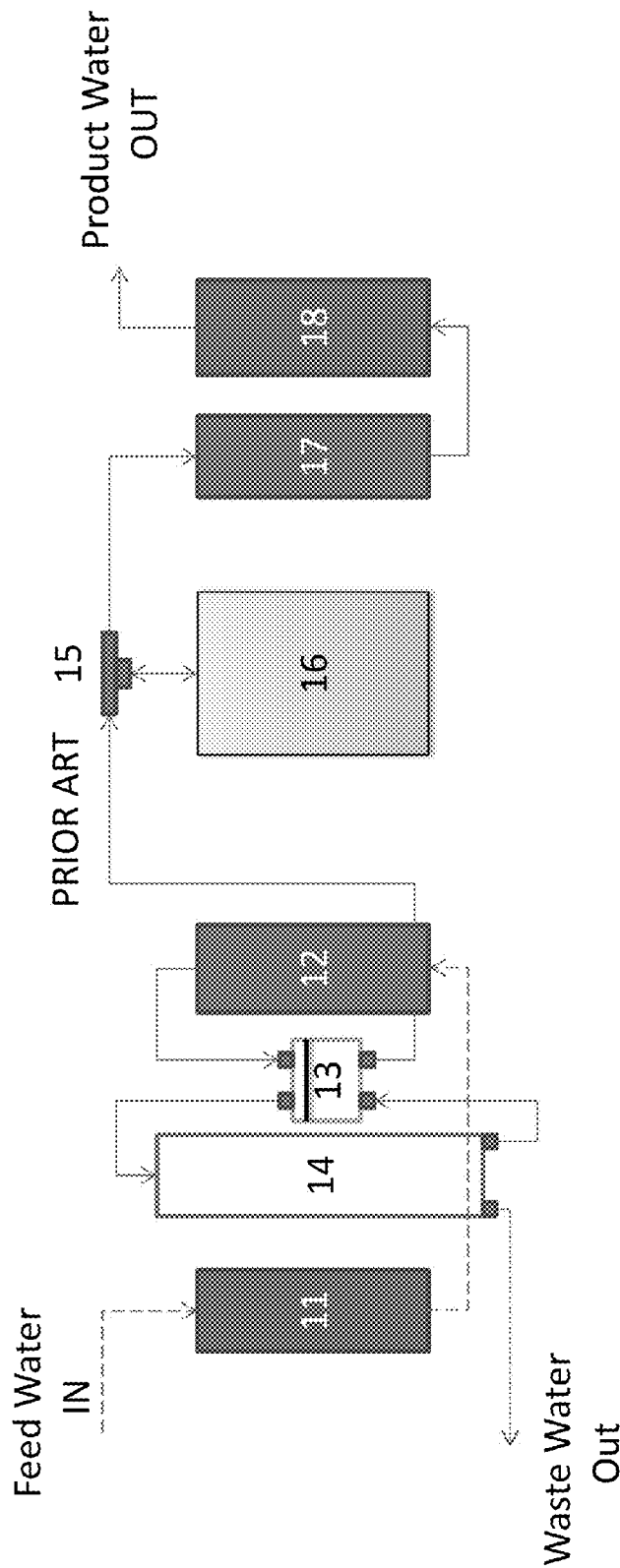
FIG. 2 shows the typical prior art RO system with the UV filter located just prior to the point of use.

The water treatment system entitled FULL CONTACT UV is a modular filter based reverse osmosis system which first strips the water clean of approximately 98% total dissolved solids including minerals, then uses a single UV filter to sterilize the (RO) product water twice, once before the water storage tank and once again as the water exits the system. Passing the water from a potable municipal or well water supply through a sediment filter, carbon or other media filter, and the reverse osmosis filter removes on average 98% of sediment, chlorine and most common chemicals found in our municipal water supply and dissolved solids, however RO is not principally rated for microorganism removal as it develops micro-tears during its otherwise useful lifecycle. The water then passes through an ultraviolet (UV) light filter which is rated to sterilize the water. In a typical residential drinking water or light garden application the UV filter flow rate is rated at 1 gallon per minute whereby 99.99% of microorganisms are destroyed/inactivated. As the water exits the RO housing in a typical residential drinking water application it has a flow rate of 1-6 gallons per hour, and it exits the system after the storage tank with a diminishing flow rate from 1.5-0.5 gallons per minute until the storage tank empties and then the flow rate will equal the RO membrane production flow rate. Flow rate is important because the slower the flow rate the greater the sterilizing effect of the UV filter. An alternative would be to slow the flow rate to allow longer sterilization, or speed it up if the sterilization is adequate, or less sterilization is required. Another alternative would be to include an array of UV sterilizers along a single pathway to extend the amount of time and water that is directly exposed to intense UV. Another possible alternative to improve the UV effectiveness would be to split the water into multiple flow lines and have the water pass through one or multiple UV sterilizers either along each flow line, to pass all the lines through one sterilizer, or to pass the water streams sequentially through the UV sterilizer.

It is contemplated that any fluid that requires treatment for sediments, particulates or sterilization may be perfected with the present invention. The invention does not have to be limited to water, but may be used in part, or in whole for a variety of other fluids ranging from the organic, polar and non-polar fluids. For instance, certain fluids may require only UV-sterilization, and it is contemplated that an embodiment of this invention would include dual UV sterilization without utilizing other or any filtration media.

After exiting the RO membrane housing the water is then passed through a carbon or mixed media filter, then through the UV sterilization filter on its way to a storage vessel for storage, until a user opens a faucet or otherwise creates a demand. Once the water is demanded it leaves the storage tank, is channeled back through the same carbon or mixed media filter, then through the UV sterilization filter a second time through the use of check valves to filter and sterilize the water again before it is dispensed for use. The check valves also serve to ensure the water flowing from the storage tank to the point of use does not bypass the carbon or mixed media filter, and the UV sterilization filter entirely. IMPORTANT NOTE: the first 6 gallons of water produced from the FULL CONTACT UV water treatment system following the initial start-up are not meant to be consumed. The user is instructed to flush out the system and run the water into the drain. The pH will be much higher than normal, contain loose carbon, potentially shielding microorganisms with the loose carbon, and contains a preservative from the membrane. Afterwards the finished water will meet the specifications outlined in this utility patent for approximately 1500 gallons before service is needed in a residential drinking water or gardening application under typical well or municipal water conditions.

The following is the detail description FIG. 4 showing flow process:
Step 1: Water from RO system, passes through 3-way tee #41 and enters Carbon/media filter #42.
Step 2: Water exits Carbon/media filter #42, and enters UV sterilization filter #43.
Step 3: Water exits UV sterilization filter passes through 3-way tee #44, through Check Valve #45, through 3-way tee #46, and into storage vessel #47.
Step 4: Upon demand, water flows from Storage Tank #47 through Check Valve #48 and enters Carbon/media filter #42.
Step 5: Water exits Carbon/media filter #42, and enters UV sterilization filter #43 a second time.
NOTE: Check Valve #45 prevents the water from the storage tank from bypassing the Carbon/media filter #42 upon demand. Instead it forces the water back through the Carbon/media filter #42 and UV sterilization filter #43 a second time ensuring dispensed water is sterile and protecting internal components while using just one UV Filter.
NOTE: Check Valve #48 prevents water from the RO from going directly to the storage tank and by-pass the Carbon/media filter #42 and UV sterilization filter #43. Instead it forces the water to flow through the Carbon/media filter #42 and UV sterilization filter #43.

Figure 3:
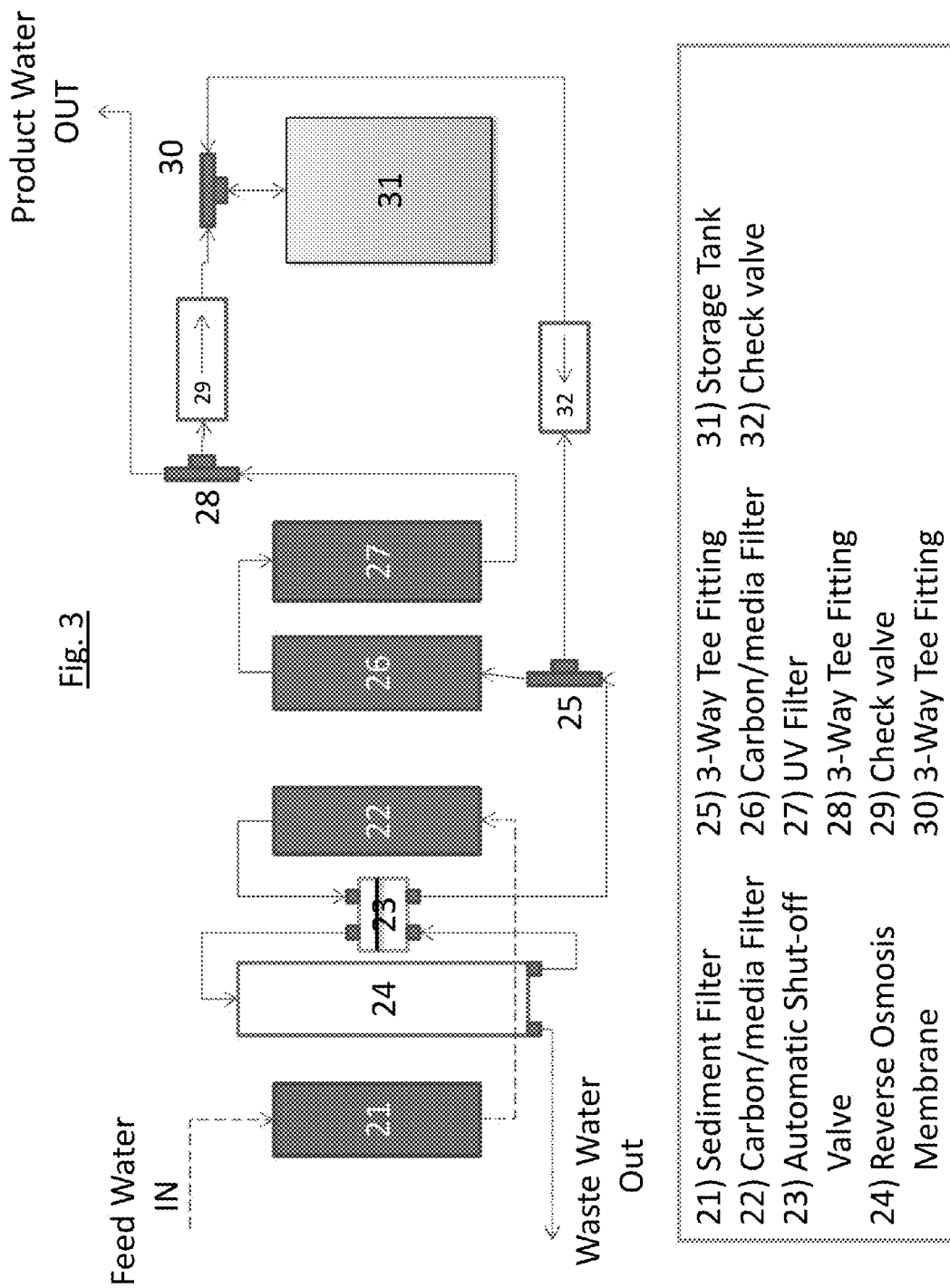
FIG. 3 shows an embodiment of the present invention as the FULL CONTACT UV forced double UV sterilization system added to the original modular RO system with UV system.

The following is the detail description FIG. 3 showing flow process:
Step 1 (optional): Water enters Sediment filter #21.
Step 2 (optional): Water exits sediment filter #21, and enters Carbon/media Filter #22.
Step 3: Water (exits Carbon media filter and) moves onto Automatic Shut-off Valve #23, and onto Reverse Osmosis Membrane #24.
Step 4: Water exits RO membrane and passes through Automatic Shut-off Valve #23 to then proceed to 3-Way Tee Fitting 25.
Step 5: Water is initially directed from RO membrane #24 and Automatic Shut-off valve #23 through 3-Way Tee Fitting 25 to Carbon/media Filter 26 and through UV Filter #27.
Step 6: Water is then passed from UV Filter #27 first pass through 3-Way Fitting #28 through to Check Valve #29 and onto Storage Tank #31 via 3-Way Tee Fitting #30.
Step 7: Upon demand. Water exits Storage Tank #31, and is directed to Check Valve #32 via 3-Way Tee Fitting #30. Water passes through 3-Way Tee Fitting #25 and through Carbon/media Filter #26 and UV Filter #27 and is then directed OUT via 3-Way Tee Fitting #28.

The term particulate filter will refer to a carbon filter, an RO-treatment system, or similar purification system or any filtration medium mentioned above or known in the art. In addition, a UV sterilization filter can refer to a UV irradiation component alone, or in combination with another filter. Carbon is a substance that has a long history of being used to absorb impurities and is perhaps the most powerful absorbent known to man. Activated carbon is carbon which has a slight electro-positive charge added to it, making it even more attractive to chemicals (such as free chlorine) and impurities. As the water passes over the positively charged carbon surface, the negative ions of the contaminants are drawn to the surface of the carbon granules. Activated carbon filters used for home water treatment typically contain either granular activated carbon (GAC) or powdered block carbon.

Reverse osmosis removes salt and most other dissolved inorganic material present in the water, and for that reason, RO lends itself to use in places where the drinking water is brackish (salty), contains nitrates, radionucliotides, heavy metals or other dissolved minerals which are difficult to remove by other methods. Using a quality carbon filter to remove any organic materials and chemicals that get through the sediment pre-filter, in conjunction with RO produces water with a purity that approaches distilled water. Microscopic parasites (including viruses) are usually removed by RO units, but any defect or micro-tear in the membrane will allow these organisms to pass into the 'clean" water. This is why RO systems are not rated to remove microorganisms except when an Ultraviolet Light filter is incorporated into the system.

The modern RO system is a unit consisting of a sediment pre-filter to remove particulates, turbidity, sand and rust; an activated carbon pre-filter to remove the chlorine, pesticides, herbicides, disinfectants, and VOCs which might otherwise damage the reverse osmosis membrane; the reverse-osmosis membrane which removes an average of dissolved solids such as heavy metals, lead, salt, chromium, other minerals and ions; a storage tank, and an activated-carbon post filter. The carbon post filter or polishing filter is necessitated by the demineralized, slightly acidic RO water attacking the rubber inside the storage tank, dissolving some of the rubber. This can be avoided by remineralizing the water prior to storage. This remineralization technology is found in the ARTESIAN FULL CONTACT system developed by Perfect Water Technologies. This water treatment system—the FULL CONTACT UV is an evolution and an improvement of both the ARTESIAN FULL CONTACT as shown and described in U.S. Pat. No. 7,507,334 to Sigona (incorporated herein) and UV reverse osmosis systems (incorporated herein) available from THE PERFECT WATER at Perfect Water Technologies, 7701 E. Gray Rd., Suite 104, Scottsdale, Ariz. 85260, or www.theperfect water.com. The improvement consists of forcing the water through the UV sterilization filter a second time and thus this section will be confined to the improvement. However it is worth noting that the ARTESIAN FULL CONTACT and UV are both modular filter based reverse osmosis systems, distinctly different from canister filter based reverse osmosis systems, in their components, method of assembly, and benefits to the end user. It is contemplated that the modular RO filter based system is preferable, but any filtration system, embedded, modular, or as known in the art will suffice. In addition, although the mention of particular RO membrane filters are made in this invention, any RO or other filtration membrane will suffice for the purposes of this invention.

The addition of the UV sterilization filter to the FULL CONTACT components is what makes the FULL CONTACT UV effective and distinct. These components are simple and few but their impact are substantial. In a preferred embodiment, the components are: one UV sterilization filter, one carbon/media filter, two, ⅜" check valves; and two, ⅜" tee fittings. Please see FIG. 4 for an illustration of the FULL CONTACT UV components. Please note: this system can be built with either smaller diameter or larger diameter components to scale the system up or down for different applications.

On the previous model—the UV—a modular-filter based reverse osmosis system with a UV sterilization filter located prior to the storage tank. We chose this location because the flow rate at this point is very slow, far below the flow rate maximum allowable to ensure 99.99% sterilization, and thus with the increased contact time the sterilizing dosage of UV light is increased 10 times or more. The drawback is that any pre-existing microorganisms downstream of the UV sterilization filter would not be treated. Within the FULL CONTACT UV, the water is diverted after the first contact with the UV sterilization filter, before the faucet, through a tee fitting through a section of tubing and through a check valve, into a tee fitting which connects to the storage tank and also back into the system. Without that check valve the water would bypass the UV sterilization filter upon demand and travel directly from the storage tank to the faucet. Upon demand that check valve blocks the water flow up to the faucet and instead forces the water down through another check valve back into the system and through the UV sterilization filter another time to achieve full contact and solves the problem of where to locate the UV sterilization filter to ensure both system hygiene and sterile water output using only one UV sterilization filter. The addition of the second check valve on the section of tubing located between the tee, which is located before the UV sterilization filter, and the storage tank prevents the water from flowing directly into the storage tank and bypassing the UV sterilization filter before the first contact. See FIG. 4.

Using the invention: The FULL CONTACT UV produces purified and sterilized water for drinking, cooking, and/or watering high value plants. It should be connected to a home or office kitchen cold water supply using municipal or well water. The system is mounted underneath a sink, and the finished purified and sterilized "full contact UV" water is dispensed through a separate, dedicated faucet mounted on the sink next to the main kitchen faucet or diverted with tubing to a refrigerator or hydroponics reservoir. A separate hole may need to be drilled in the sink if an extra hole is not available. The user will open the faucet or reservoir valve in the normal manner, creating a demand and fill any water safe receptacle and use the water for drinking, cooking, watering or making ice. The Full Contact UV water treatment system can also be plumbed to a refrigerator's water and ice center, a stand-alone icemaker, a bottle-les water cooler, a coffee maker or drip system that accepts a plumbed in water line.

For agricultural purposes, treated water use provides unique challenges. One major concern is that water used for irrigation purposes is often demanded at a much higher rate that for personal consumption. As such the present system may be modified to include a higher through-put flow post storage system. The higher output rate exacerbates the issues of sterilization considering that water storage tanks are often located and stored in less ideal locations as they would be in a climate controlled residence. Therefore, UV-sterilization is more important and a greater challenge.

To modify the system for agricultural purposes, one embodiment of the invention includes a larger diameter outflow tube. To compensate for the greater flow rate, a more intense UV irradiation may be used. Otherwise the water can be routinely looped through the UV sterilizer more than once after exiting the storage vessel. An extra UV-irradiation unit may be included in serial to irradiate the flow over a longer section of the outflow tube, or the outflow may be comprised of multiple parallel streams that each contain separate UV sterilizers.

What is claimed is:
1. A water treatment system comprising:
a fluid supply inlet;
a purification system fed from said fluid supply inlet and disposing effluent discharge via an effluent discharge outlet; and
a dispensation outlet;
wherein pressure from fluid supply inlet forces fluid through the water treatment system and the water treatment system does not include a pump,
wherein said purification system comprises:
a UV sterilization filter comprising a downstream end;
a filter inlet line connected to said sterilization filter;
at least one RO treatment unit for processing fluid into RO-treated water, said RO treatment unit connected to said filter inlet line;

wherein said sterilization filter is connected to said filter inlet line for receiving RO-treated water from said at least one RO treatment unit;

a filter outlet line connected to the downstream end of said filter;

a water storage tank for storing RO-treated water;

a recirculation line in fluid communication with said filter outlet line and said filter inlet line;

a first check-valve along said recirculation line, said first check-valve oriented to permit fluid to flow from said filter outlet line towards said storage tank; and a second check valve along said recirculation line oriented to permit fluid to flow from said storage tank towards said filter inlet line, wherein said storage tank is in fluid communication with said recirculation line at a point between said first and second check valves such that water from said at least one RO treatment unit can be forced to flow through said filter once before entering said storage tank, and water from said storage tank can be forced to flow through said filter a second time in order to dispense water from said water treatment system whereby said UV sterilization filter comprises a final treatment component directly connected to a dispensation line without any further treatment prior to said dispensation outlet.

2. The water treatment system of claim 1 wherein the water dispensed from the system is sterilized twice via UV-irradiation, a first time before entering said water storage tank, and a second time prior to dispensation.

3. The water treatment system of claim 2 wherein the RO-treated water is not sterile.

4. The water treatment system of claim 3 wherein the water exiting the system is 99.99% sterile.

5. The water treatment system of claim 3 wherein the water entering the system storage tank is 99.99% sterile.

6. The water treatment system of claim 1 wherein said treatment unit utilizes at least one modular filter component.

7. The water treatment system of claim 1 wherein said system comprises only one UV sterilization filter.

8. A fluid treatment system comprising a fluid supply inlet, a purification system, effluent discharge, and dispensation outlet, whereby said purification system comprising:

a UV sterilization filter for receiving fluid;

at least one particulate filter for removing particles from fluid;

a storage vessel for storing fluid;

wherein the UV sterilization filter, the at least one particulate filter, and the storage vessel are arranged in a flow line configuration wherein fluid entering through said fluid supply inlet into the system passes through said at least one particulate filter, then said UV sterilization filter a first time; and enters into said storage vessel;

wherein the fluid is then forced from said storage vessel and passes through said at least one particulate filter, and then through said UV sterilization filter a second time before being directly dispensed through said dispensation outlet without any intervening treatment; and wherein pressurization force on fluid in said fluid supply inlet forces fluid through the fluid treatment system and said fluid treatment system does not include a pump.

9. The fluid treatment system of claim 8 further comprising a remineralization filter.

10. A method for treating a fluid through a pump-free purification system comprising the steps of:

supplying pressurized water into the system through an inlet;

sterilizing the fluid with UV irradiation a first time;

storing the fluid into a storage vessel;

pulling the fluid from the storage vessel;

further sterilizing the fluid with UV irradiation; and dispensing the fluid through an outlet;

whereby the step of further sterilizing occurs immediately prior to the step of dispensing; and whereby the steps of supplying, pulling and dispensing are powered by the incoming pressurized water and the purification system does not include a pump.

11. The method of claim 10 further including the step of filtering the fluid through at least one particulate filter.

12. The method of claim 11 wherein said step of filtering the fluid comprises an RO-treatment.

13. The method of claim 12, wherein the step of filtering is conducted prior to the step of sterilizing, and further comprising the step of remineralizing the water prior to the step of storing.

14. The method of claim 11 further including the step of filtering the fluid through a particulate filter a second time.

15. The method of claim 14 wherein said step of filtering the fluid a second time is conducted just prior to sterilizing the fluid a second time.

16. The method of claim 11 wherein said step of filtering the fluid comprises a carbon media filter.

17. The method of claim 10 wherein said steps of sterilizing the fluid a first and second time occur via a single UV-irradiation unit.

\* \* \* \* \*